United States Patent [19]

Ohmstede et al.

[11] Patent Number: 5,294,220
[45] Date of Patent: Mar. 15, 1994

[54] MACHINING APPARATUS

[75] Inventors: Robert L. Ohmstede, Beaumont; Wesley D. Cawley, Port Neches; Clifton M. Cawley, Nederland, all of Tex.

[73] Assignee: Ohmstede, Inc., Beaumont, Tex.

[21] Appl. No.: 81,817

[22] Filed: Jun. 22, 1993

[51] Int. Cl.⁵ .................. B23B 39/00; B23C 1/00
[52] U.S. Cl. ................... 409/137; 408/67; 408/91; 408/234; 409/134; 409/219
[58] Field of Search .......... 409/134, 137, 159, 163, 409/219, 235; 408/67, 87, 88, 91, 234, 241 G

[56] References Cited

U.S. PATENT DOCUMENTS

| | | |
|---|---|---|
| 2,108,823 | 2/1938 | Lyon . |
| 2,302,813 | 11/1942 | Stuhlfauth et al. ........... 409/225 |
| 2,795,978 | 6/1957 | Kinsey . |
| 2,963,725 | 12/1960 | Bredtschneider .......... 15/104.1 |
| 3,533,327 | 10/1970 | Hagerty ................... 90/11 |
| 3,998,127 | 12/1976 | Romeu .................... 90/14 |
| 4,102,592 | 7/1978 | Mackinder ............... 408/46 |
| 4,178,834 | 12/1979 | Holmstrom ............... 409/80 |
| 4,242,019 | 12/1980 | Roch .................... 409/185 |
| 4,621,407 | 11/1986 | Suzuki .................... 29/568 |
| 4,684,303 | 8/1987 | Erdt et al. ............... 409/235 |
| 4,705,432 | 11/1987 | Zimmerman et al. ........ 409/132 |
| 4,727,785 | 3/1988 | Taguchi .................. 83/113 |
| 4,867,620 | 9/1989 | Newman et al. ........... 409/134 |
| 4,909,293 | 3/1990 | Maioli .................. 144/252 R |
| 4,950,113 | 8/1990 | Winkler et al. ........... 409/134 |
| 5,078,256 | 1/1992 | Hatano et al. ............ 198/360 |

FOREIGN PATENT DOCUMENTS

| | | |
|---|---|---|
| 527382 | 7/1956 | Canada . |
| 2521052 | 11/1976 | Fed. Rep. of Germany ...... 408/234 |
| 64-40254 | 2/1989 | Japan . |
| 204088 | 8/1965 | Sweden . |
| 1038167 | 8/1983 | U.S.S.R. ................. 409/134 |
| 2117510A | 10/1983 | United Kingdom . |
| 2154914A | 9/1985 | United Kingdom . |

Primary Examiner—Daniel W. Howell
Attorney, Agent, or Firm—Pravel, Hewitt, Kimball & Krieger

[57] ABSTRACT

An improved machining apparatus for machining a workpiece. The machining apparatus includes a base assembly having a base support member and a table support frame non-movably attached to the base support member. A pair of cross members span the upper surface of the table. The table support frame has a longitudinal axis transverse to the cross members and includes a raceway for allowing lateral displacement of the table relative to the base assembly. At least one spindle is mounted on the cross members and can be displaced along the longitudinal axis of the cross members. Flexible retractable covers are mounted on spring-loaded rollers attached to the ends of the table support frame. The machining apparatus further includes a conveyor positioned proximate the base assembly at the lower edge of the table for removing cuttings and debris resulting from the machining of the workpiece.

14 Claims, 3 Drawing Sheets

MACHINING APPARATUS

BACKGROUND OF THE INVENTION

1. Field of the Invention

This invention relates to an apparatus for milling and drilling a workpiece. More particularly, this invention relates to an improved milling and drilling apparatus which keeps the workpiece at a fixed inclination for maximum efficiency and optimum performance.

2. Description of the Prior Art

Large, table-based drilling and milling apparatus are well known. Further, it is known to incline the workpiece at an angle to encourage the removal of chips and other metal debris. See, for example, U.S. Pat. Nos. 4,102,592 and 5,078,256. In addition, the use of a movable or variably-inclinable work table is also known. See U.S. Pat. No. 4,705,438. However, the need exists for a large milling and drilling device which is more simplistic in its construction and includes a minimal number of moving parts to prolong operational life. Furthermore, the need exists for a large drilling/milling apparatus which provides for optimum protection of the moving parts from falling chips and other debris.

SUMMARY OF THE INVENTION

The present invention relates to an improved machining apparatus which includes a base assembly having a table support frame which is inclined at a fixed angle of approximately 30° with the horizontal. A work table is movably mounted to the table support frame. The work table has an upper surface which is inclined at a fixed angle of approximately 30° with the horizontal. A workpiece is supported on the work table. The apparatus includes a means for laterally displacing the work table along the longitudinal or X-axis of the table support frame. A pair of cross members span the work table and support a spindle unit which is mounted between the pair of cross members. The spindle unit is adapted to move in a Y-axis direction parallel to the work table and transverse to the lateral X-axis movement of the work table. In this manner, holes and other milling operations can be performed on the workpiece both in X-axis and Y-axis orientation. The apparatus includes a retractable cover on each side of the work table which protects the lateral carrier rods and guides (on which the work table laterally moves) from falling chips and other debris. A chip removal system is supported on the base assembly at the lower end and includes a conveyor mechanism for removing the chips as they fall off the work table onto the conveyor system. In addition, the apparatus includes a vacuum system to collect dust and other airborne particles during the drilling and milling operations.

BRIEF DESCRIPTION OF THE DRAWINGS

In order to more fully understand the drawings used in the detailed description of the present invention, a brief description of each drawing is presented, in which:

FIG. 2 is a top plan view of the present invention;

FIG. 5 is a cross-sectional view taken along line 5—5 of FIG. 2.

DETAILED DESCRIPTION OF PREFERRED EMBODIMENT

Figure 1:
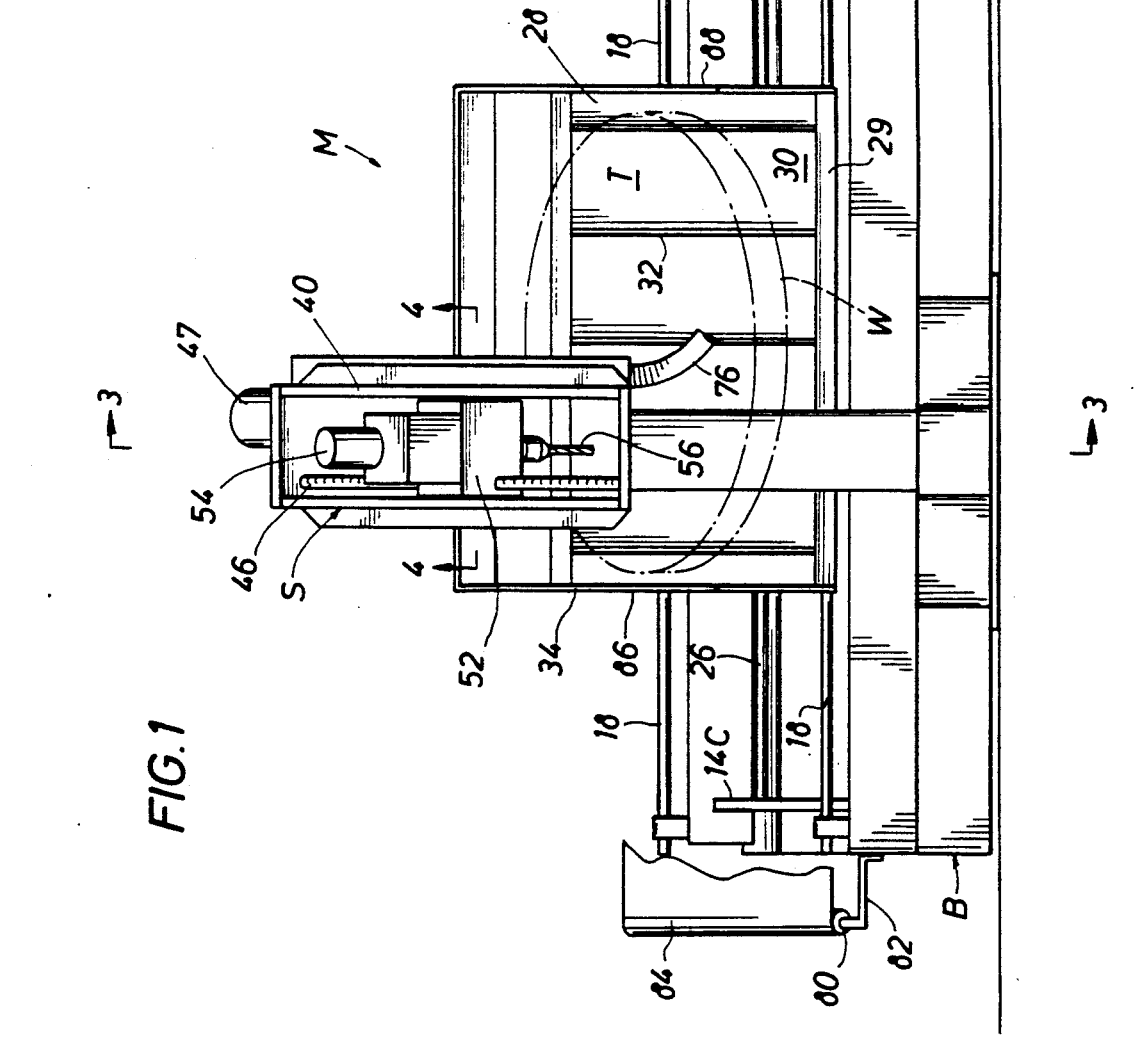
FIG. 1 is a front elevation view of the present invention.
Figures 2, 5:
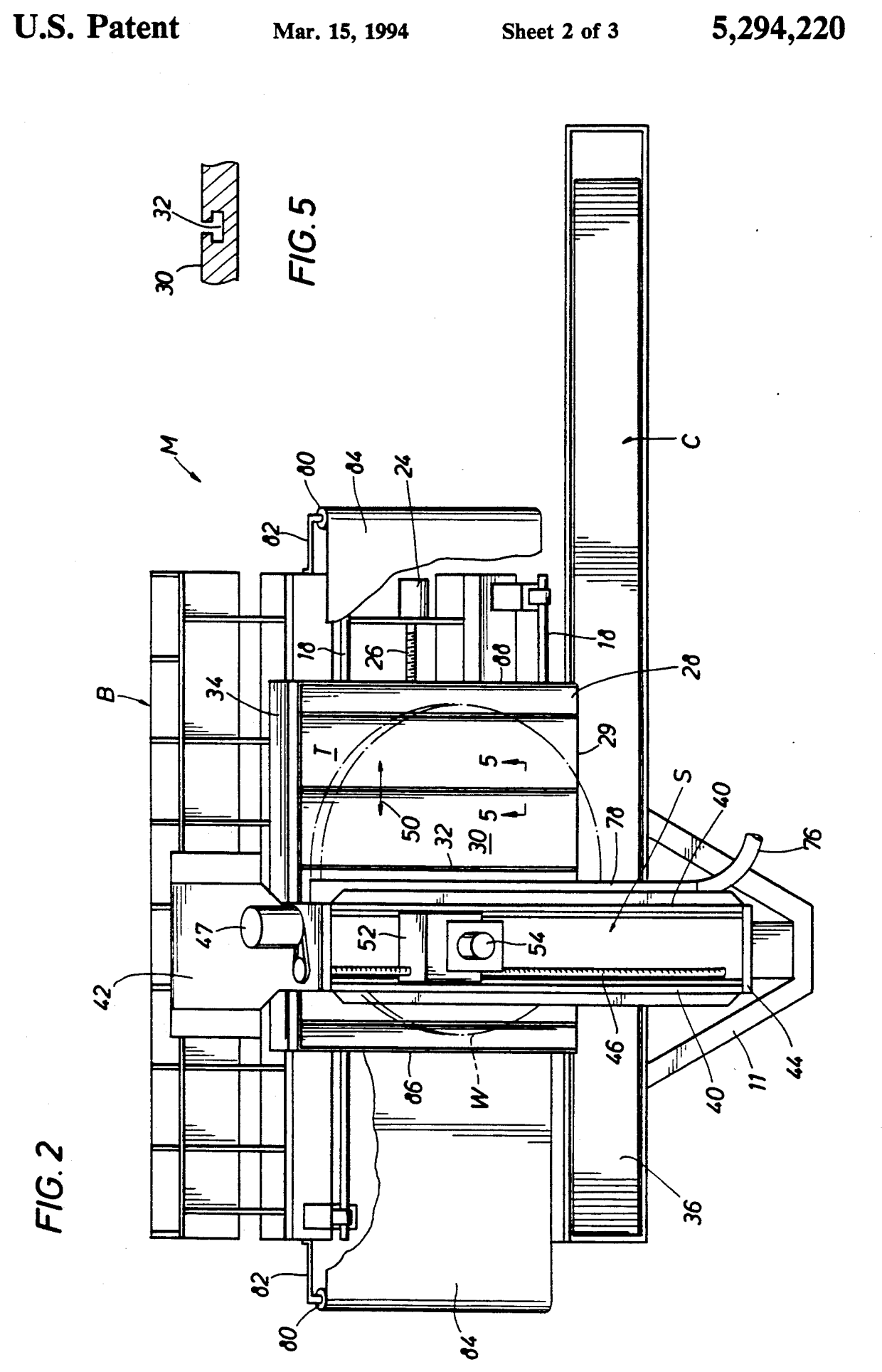
Figure 3:
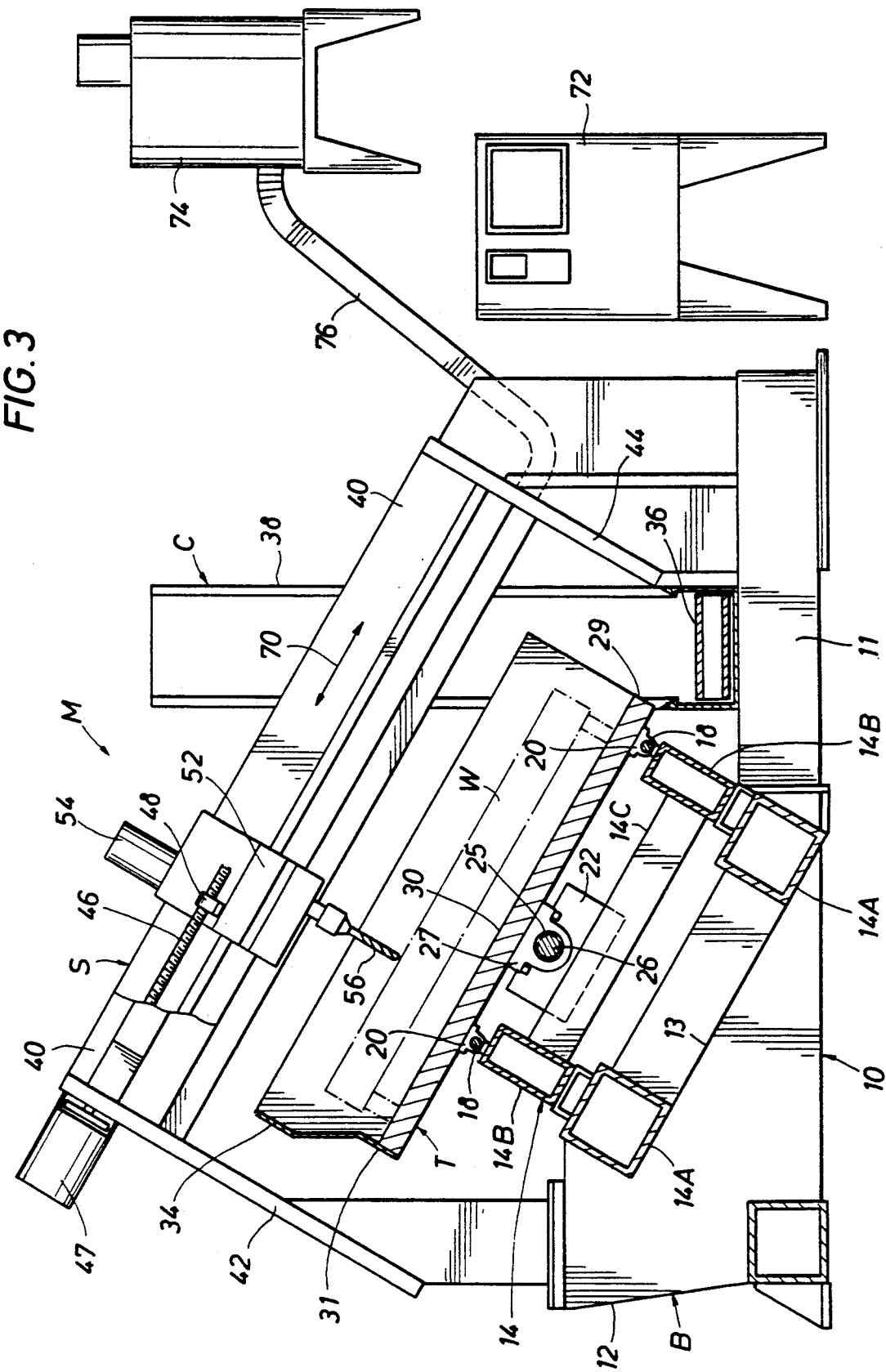
FIG. 3 is a cross-sectional view taken along line 3—3 of FIG. 1.

Referring to FIGS. 1-3, the machining apparatus of the present invention, designated generally by the letter M, includes a base assembly B, a work table assembly T, a spindle support assembly S, and a conveyor assembly C.

Referring to FIG. 3, the base assembly B is shown generally comprising a base support member 10 and a table support frame 14. The base support member 10 includes a forward portion 11 and a rear portion 12. The rear portion 12 includes an inclined section 13 for mounting the table support frame 14 thereto. The table support frame 14 includes two pairs of connected parallel beams 14A and 14B. The pair of lower beams 14A are fixedly attached to the base support member 10 at the inclined section 13. In the preferred embodiment of the present invention, the inclined section 13 and the table support frame 14 are each at a fixed angle of approximately 30° with the horizontal for reasons which will be explained below. The pair of upper beams 14B are braced to each other with a plurality of braces 14C as shown in FIG. 3. A lateral carrier rod 18 is mounted to the upper surface of each of the upper beams 14B.

The work table assembly T includes a large planar table 28 having a generally smooth upper surface 30. Referring to FIGS. 1, 2 and 5, the upper surface 30 includes a plurality of generally inverted T-shaped grooves 32 for clamping and securing a workpiece W to the table 28. The plurality of grooves 32 extend from the uppermost edge 31 to the lowermost edge 29 of the table 28 to facilitate easier chip and coolant removal. The work table assembly T includes a deflector 34 attached to the periphery of the table 28 with the exception of the lowermost edge 29 of the table 28.

Referring to FIG. 3, the deflector 34 extends above the upper surface 30 of the table 28 to deflect cuttings, chips, and debris resulting from the machining operations on a workpiece W. The work table assembly T is slidably supported on the table support frame 14 by the pair of lateral carrier rods 18. As shown in FIG. 3, the lateral carrier rod 18 is a smooth shaft which is mounted to the upper surface of the upper beam 14B. The work table assembly T includes guides 20 which receive the lateral carrier rod 18 and permit lateral translation of the work table assembly T relative to the base assembly B. Referring still to FIG. 3, a motormount 22 is supported on a brace 14C which is attached to beams 14B. The motormount 22 supports an electric or hydraulic motor 24 which in turn drives a threaded drive shaft 26. The drive shaft 26 is rotatably mounted to the table support frame 14. A carriage member 27 is attached to the lower surface of the work table 28. The carriage member 27 has an internally threaded bore 25 which threadably engages the threaded drive shaft 26. In this manner, rotation of the drive shaft 26 by the motor 24 will drive the work table assembly T in the lateral direction or along the X-axis as generally indicated by the arrows 50 as shown in FIG. 2.

As shown in FIG. 3, the upper surface 30 of the table 28 faces generally upwardly and the table 28 is inclined at a fixed angle of approximately 30° with the horizontal. The inclined surface 30 of the table 28 causes the cuttings and debris to roll or slide down the surface of the workpiece W and the surface 30 of the table 28.

Positioned beneath the lowermost edge 29 of the table 28 is a rotatable endless conveyor 36. The cuttings and debris fall off the table 28 at the lowermost edge 29 onto the rotatable endless conveyor 36 of the conveyor assembly C. The conveyor assembly C is positioned such that as the table 28 moves along table support frame 14, the conveyor 36 is beneath the lowermost edge 29 of the table 28 all the time to collect the cuttings and debris As shown in FIG. 1, the conveyor assembly C includes a generally upright portion 38 which directly discharges the cuttings and debris into a dumpster or refuse container (not shown).

Referring to FIGS. 1 and 2, a spring-loaded roller 80 is attached to each end of the table support frame 14 by a roller bracket 82. A flexible cover 84 is rolled onto each spring-loaded roller 80. The left flexible cover 84 has a first end attached to the left roller 80 and a second end attached to the left end 86 of the table 28. The right flexible cover 84 has a first end attached to the right roller 80 and a second end attached to the right end 88 of the table 28. The flexible covers 84 can be unrolled from the rollers 80 by pulling on the second end of the covers 84. Thus, as the table 28 moves laterally along the table support frame 14, the covers 84 constantly protect the table support frame 14, the lateral carrier rods 18 and drive shaft 26 from flying debris, cuttings, chips, etc. which can be detrimental to the operation of the machining apparatus M.

Referring back to FIG. 3, the spindle support assembly S includes a pair of cross members 40 which span above the table 28 and the deflector 34. The lower edge of the pair of cross members 40 is parallel to the table 28 from the lowermost edge 29 to the uppermost edge 31. The cross members 40 are nonmoveable and are rigidly attached to the base assembly B by a rear cross member support 42 attached to the rear portion 12 and a forward cross member support 44 attached to the forward portion 11. The cross members 40 are parallel and spaced a uniform distance from one another. A threaded spindle drive rod 46 is rotatably mounted between the pair of cross members 40. The spindle drive rod 46 is mounted at one end to the rear cross member support 42 and at the other end to the forward cross member support 44.

Figure 4:
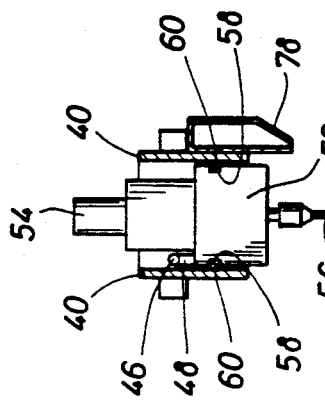
FIG. 4 is a cross-sectional view taken along line 4—4 of FIG. 1.

Referring to FIGS. 3 and 4, a spindle carriage member 48 is attached to a spindle support member 52. Referring to FIG. 4, the spindle support member 52 includes a pair of grooves 58 which receive guide bars 60. The guide bars 60 are attached to the cross members 40 and extend generally the length of the cross members 40. The guide bars 60 maintain the spindle support member 52 in uniform spatial relationship with the upper surface 30 of the table 28.

Referring to FIG. 3, the spindle carriage member 48 includes an internally threaded bore (not shown) which threadably engages the threaded spindle drive rod 46. In this manner, rotation of the threaded spindle drive rod 46 by a motor 47 will drive the spindle support member 52 in the longitudinal direction of the cross members 40 or along the Y-axis as generally indicated by the arrows 70 as shown in FIG. 3.

Referring now to FIGS. 1 and 4, a spindle unit 54 is mounted to the spindle support member 52. A machining tool 56, such as a drilling tool, is mounted to the spindle unit 54. It may be desirable to use a plurality of drilling tools 56 simultaneously. If such is the case, additional spindle units 54 or drilling tools 56 may be mounted to the spindle support member 52 and displaced along the longitudinal axis of the cross members 40. The pair of cross members 40 provides dual centering support for offsetting the spindle thrust load of the spindle unit 54 during the machining operations.

In the preferred embodiment of the present invention, the machining apparatus M includes a programmable computer 72. The programmable computer 72 stores the coordinates of the desired milling or drilling operations and controls the motors 24 and 47 to accurately position the lateral placement of the workpiece as well as the transverse placement of the machining tool 56. The use of such a programmable computer is well known to those skilled in the art. One example of a suitable computer is model 810M manufactured by Siemens of Germany.

Referring back to FIG. 3, the machining apparatus M also includes a suction device 74 which is connected to the spindle support assembly S via a flexible air conduit 76. The flexible air conduit 76 is attached to an intake duct 78 (see FIG. 2) mounted to the outer surface of a cross member 40. The suction device creates a partial vacuum and removes airborne dust and chip particles created during the machining of the workpiece W.

OPERATION OF THE PRESENT INVENTION

Referring to FIGS. 1 and 2, the work table assembly T is moved along the table support frame 14 by the motor 24 rotating the drive shaft 26. The work table assembly T is moved to the right-hand end of the table support frame 14 to facilitate placement of the workpiece W upon the inclined table 28. In the preferred embodiment, the table support frame 14 has a length sufficient to permit the entire upper surface 30 of the table 28 to vertically clear the spindle support assembly S such that the entire table surface 30 is unobstructed and available to receive the workpiece W. The workpiece W is secured to the table 28 via clamps (not shown) inserted in the inverted T-shaped grooves 32. Once the workpiece W is secured, the table 28 and the workpiece W are brought beneath the spindle support assembly S. As the table 28 moves laterally along the table support frame 14, the covers 84 constantly protect the table support frame 14, the lateral carrier rods 18 and drive shaft 26 from falling objects and debris during the travel of the table assembly T and when the machining apparatus M is standing idle. The covers 84 further protect these components from flying debris, cuttings, chips, etc. during the milling and drilling operations.

During the actual milling and drilling operations, the programmable computer 72 has been programmed with the coordinates of the desired milling or drilling operations. The computer 72 controls the motors 24 and 47 to accurately position the lateral placement of the workpiece W and the transverse placement of the machining tool 56, respectively. The suction device 74 is activated during the milling or drilling of the workpiece W to remove airborne dust and chip particles via the intake duct 78. Chips, cuttings and other debris not captured by the suction device 74 will fall, roll or slide down along the workpiece surface or the inclined upper surface 30 of the table 28 to the conveyor 36 positioned beneath the lowermost edge 29 of the table 28. The conveyor directly carries the chips, cuttings, etc. to a dumpster in Which they are discharged.

The machining apparatus M is simplistic in its construction and includes a minimal number of moving parts to prolong the operational life of the apparatus. The fixed angle of approximately 30° for the table 28 facilitates chip removal from the workpiece W and the table 28 and facilitates the loading of the workpiece W onto the table 28. The retractable covers 84 maintain optimum protection of the moving parts associated with transverse movement of the table 28. The machining apparatus M is a rigidly constructed, heavy-duty machine that is extremely suitable to drill and mill large holes in thin to heavy plate (even plate having a thickness of approximately eight inches). The table 28 is inclined at a fixed angle and the spindle support assembly S is rigidly mounted to the base assembly B so that the machining apparatus M performs accurate and repetitive milling and drilling operations on very heavy workpieces. The machining apparatus M is extremely durable and dependable.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. An improved machining apparatus for machining a workpiece, the machining apparatus comprising:
   a base assembly;
   a table having an upwardly facing work surface inclined at a fixed angle of approximately 30° with the horizontal, said table having an upper edge and a lower edge;
   means for laterally displacing said table on said base assembly while fixedly maintaining said work surface at said angle of approximately 30° with the horizontal;
   a cross member spanning said work surface, said cross member having a first end and a second end and said first and second ends are non-movably attached to said base assembly;
   at least one spindle mounted on said cross member;
   means for displacing said spindle along the longitudinal axis of said cross member; and
   means for covering at least a portion of said base assembly as said table traverses said base assembly.

2. The improved machining apparatus according to claim 1, further comprising:
   means for controllably positioning said spindle relative to said work surface such that the location of machining performed by said spindle can be preselected;
   means for removing cuttings and debris resulting from the machining of the workpiece wherein said removing means includes a conveyor positioned proximate said base assembly at said lower edge of said table; and
   means for collecting dust and other airborne particles.

3. The improved machining apparatus according to claim 1, wherein said base assembly further comprises:
   a base support member having a front portion and a rear portion; and
   a table support frame non-movably attached to said base support member, said table support frame has a longitudinal axis transverse to said cross member, said table support frame includes a raceway for allowing lateral displacement of said table relative to said base assembly.

4. The improved machining apparatus according to claim 3, wherein said means for laterally displacing said table comprises a motor-driven worm gear assembly connecting said table support frame to said table.

5. The improved machining apparatus according to claim 1, wherein said table includes a left edge and a right edge and said means for covering comprises a left retractable cover attached to said left edge of said table and a right retractable cover attached to said right edge of said table.

6. The improved machining apparatus according to claim 5, wherein said table support frame has a left end and a right end and said left and right retractable covers are mounted to said left and right ends of said table support frame, respectively.

7. The improved machining apparatus according to claim 6, wherein said retractable covers are flexible and are each mounted on a spring-loaded roller attached to said table support frame.

8. An improved machining apparatus comprising:
   a base having a work surface inclined at a fixed angle of approximately 30° with the horizontal to support a workpiece;
   means for laterally displacing said work surface on said base while fixedly maintaining said work surface at said angle of approximately 30° with the horizontal;
   a cross member spanning said work surface and attached at one end to the upper edge of said base and at the other end to the lower end of said base;
   at least one spindle mounted on said cross member and adapted to drill at an angle of approximately 90° to said work surface;
   means for displacing said spindle along the longitudinal axis of said cross member;
   means for covering at least a portion of said base as said work surface transverses said base;
   means for controllably positioning said spindle relative to said work surface such that the location of machining performed by said spindle can be preselected;
   means for removing chips and other debris resulting from the machining of the workpiece wherein said removing means includes a conveyor positioned proximate the lower edge of said base; and
   means for collecting dust and other airborne particles.

9. An improved machining apparatus for machining a workpiece, the machining apparatus comprising:
   a base assembly;
   a table having an upwardly facing work surface inclined at a fixed angle of approximately 30° with the horizontal, said table having an upper edge and a lower edge;
   means for laterally displacing said table on said base assembly while fixedly maintaining said work surface at said angle of approximately 30° with the horizontal;
   a cross member spanning said work surface, said cross member having a first end and a second end and said first and second ends are non-movably attached to said base assembly;
   at least one spindle mounted on said cross member;
   means for displacing said spindle along the longitudinal axis of said cross member;
   means for covering at least a portion of said base assembly as said table traverses said base assembly;
   means for controllably positioning said spindle relative to said work surface such that the location of machining performed by said spindle can be preselected;

means for removing cuttings and debris resulting from the machining of the workpiece wherein said removing means includes a conveyor positioned proximate said base assembly at said lower edge of said table; and means for collecting dust and other airborne particles.

10. The improved machining apparatus according to claim 9, wherein said base assembly further comprises:

a base support member having a front portion and a rear portion; and a table support frame non-movably attached to said base support member, said table support frame has a longitudinal axis transverse to said cross member, said table support frame includes a raceway for allowing lateral displacement of said table relative to said base assembly.

11. The improved machining apparatus according to claim 10, wherein said means for laterally displacing said table comprises a motor-driven worm gear assembly connecting said table support frame to said table.

12. The improved machining apparatus according to claim 9, wherein said table includes a left edge and a right edge and said means for covering comprises a left retractable cover attached to said left edge of said table and a right retractable cover attached to said right edge of said table.

13. The improved machining apparatus according to claim 12, wherein said table support frame has a left end and a right end and said left and right retractable covers are mounted to said left and right ends of said table support frame, respectively.

14. The improved machining apparatus according to claim 13, wherein said retractable covers are flexible and are each mounted on a spring-loaded roller attached to said table support frame.

* * * * *